Figure 1:
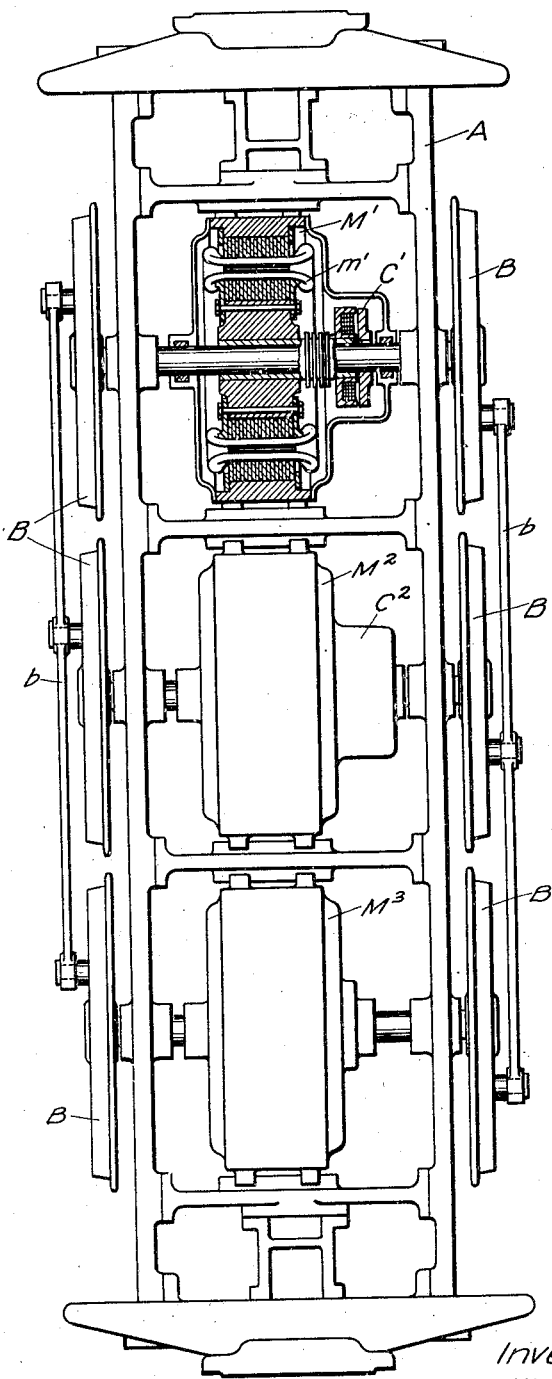

E. F. W. ALEXANDERSON.
INDUCTION MOTOR CONTROL.
APPLICATION FILED JULY 12, 1906.

901,513.

Patented Oct. 20, 1908.
3 SHEETS—SHEET 1.

Witnesses:

Inventor
Ernst F. W. Alexanderson
By
Att'y

E. F. W. ALEXANDERSON.
INDUCTION MOTOR CONTROL.
APPLICATION FILED JULY 12, 1906.
901,513.
Patented Oct. 20, 1908.
3 SHEETS—SHEET 2.
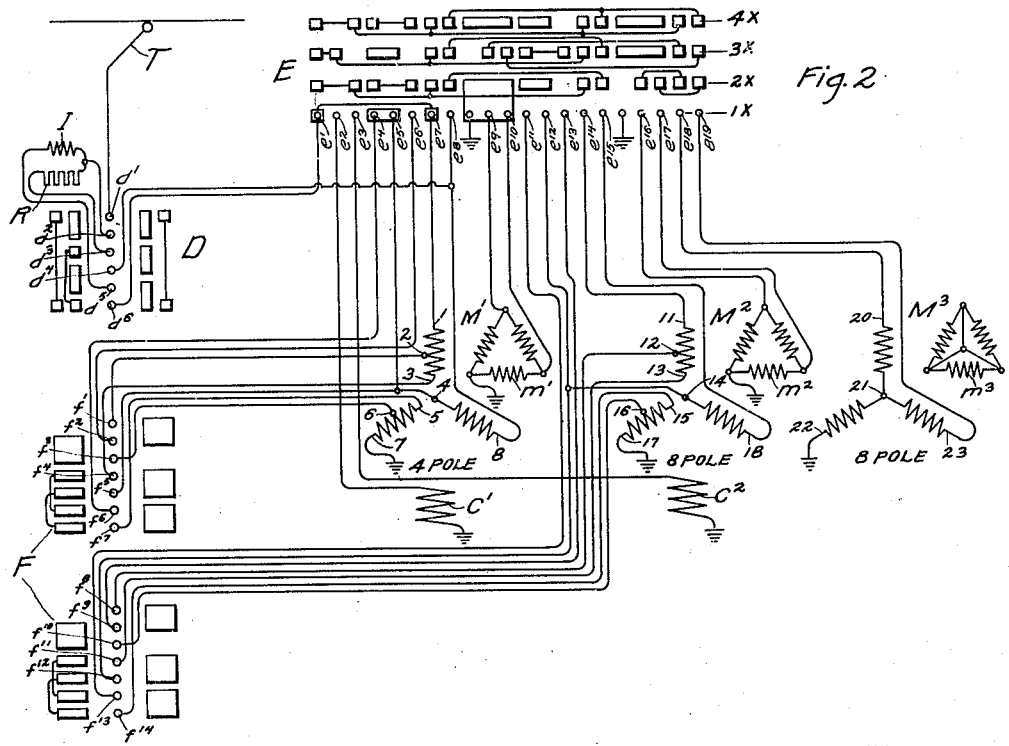
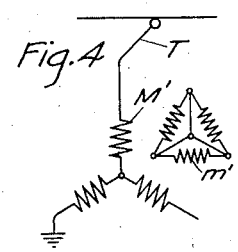
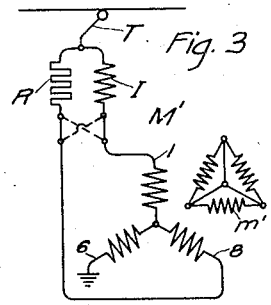
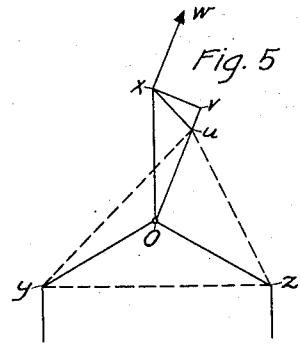
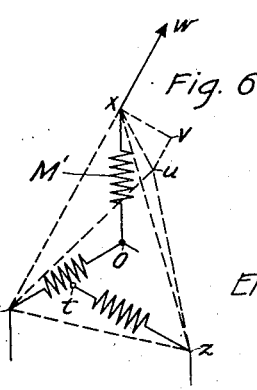
Witnesses;
Inventor:
Ernst F. W. Alexanderson
By Albert G. Davis
Att'y.

E. F. W. ALEXANDERSON.
INDUCTION MOTOR CONTROL.
APPLICATION FILED JULY 12, 1906.
901,513.
Patented Oct. 20, 1908.
3 SHEETS—SHEET 3.
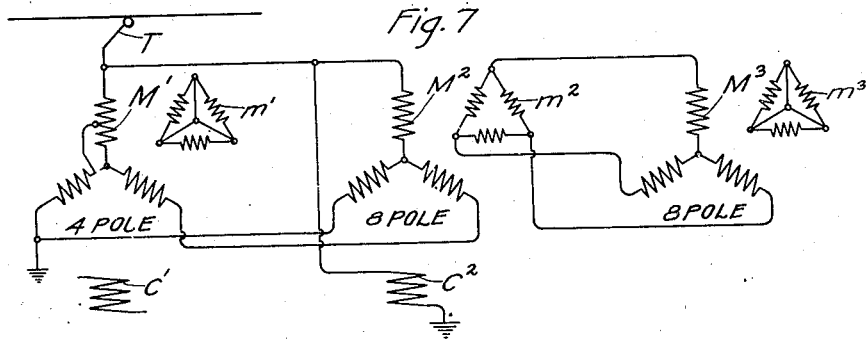
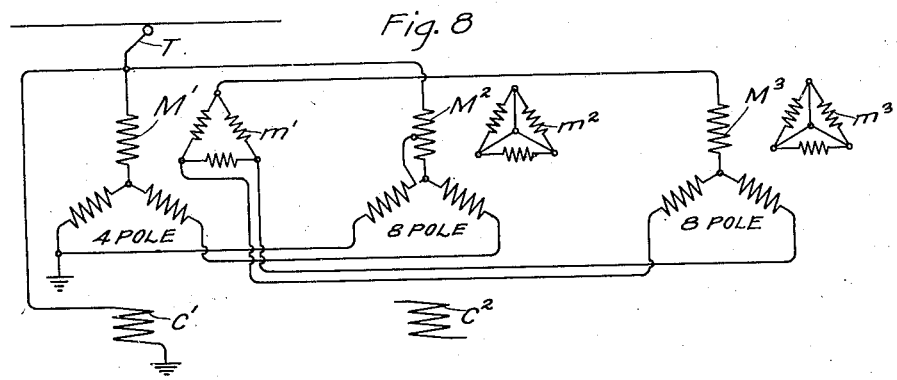
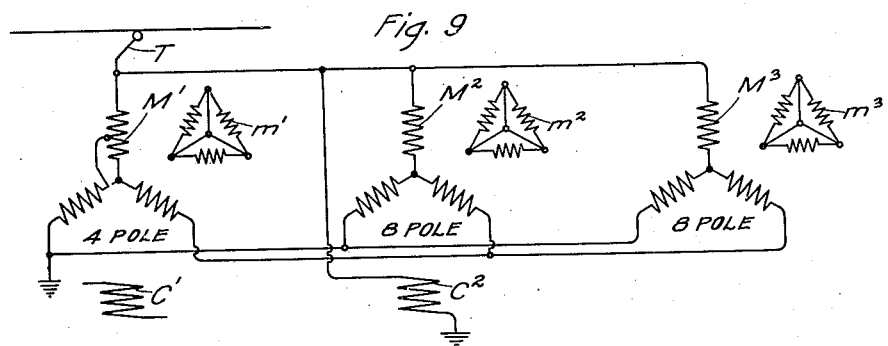
Witnesses;
Murray D Badgley
Inventor;
Ernst F. W. Alexanderson
By
Att'y

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

INDUCTION-MOTOR CONTROL.

No. 901,513.      Specification of Letters Patent.      Patented Oct. 20, 1908.

Application filed July 12, 1906. Serial No. 325,844.

*To all whom it may concern:*

Be it known that I, ERNST F. W. ALEXANDERSON, a subject of the King of Sweden, residing at Schenectady, county of Schenectady, State of New York, have invented certain new and useful Improvements in Induction-Motor Control, of which the following is a specification.

My invention relates to the control of induction motors, and is particularly applicable to the control of single-phase locomotives driven by induction motors.

It has been proposed heretofore in the case of loads driven from a single-phase source, where uniform torque is desired, as in the case of electric traction, to employ a phase-changer, which may be constructed like an induction motor, and polyphase induction motors supplied from the phase-changer.

The induction motor is substantially a constant-speed machine, and when different speeds are required it has been the practice either to vary the number of poles of the individual motor, or, in the case of a plurality of motors, to connect them in cascade and in parallel. If it is desired to obtain uniform torque in operation from a single-phase source, and to employ the cascade method of control for varying speeds, three machines are required with the ordinary arrangement for obtaining two speeds, one of the machines being employed as phase-changer, and the other two for the cascade and parallel connections. By my invention it is possible to obtain three speeds from such a combination. I accomplish this by providing three induction motors, one with a different number of poles from the other two, and so arranging the driving connections of the motors that either the first motor or one of the other two motors can be employed as phase-changer. Thus, for instance, if one motor is arranged with four poles and the other two with eight poles, then by employing the four-pole motor as phase-changer and connecting the other two machines in cascade, a speed corresponding to sixteen poles is obtained; by using one of the eight-pole machines as phase-changer and connecting the other two machines in cascade a speed corresponding to twelve poles is obtained; and by connecting the four-pole machine as phase-changer and connecting the other two machines in parallel as driving motors, a speed corresponding to eight poles is obtained. For all three speeds a uniform tractive effort is obtained, and two motors are employed at each speed for driving.

My invention, accordingly, in one aspect, consists in arranging two induction motors with different pole numbers and using them alternately as phase-changer and motor.

In another aspect my invention consists in providing two motors of different pole numbers and connecting the third motor in cascade with either of the first two and directly to the source.

My invention further consists in arranging the machine which is acting as phase-changer so that it gives a balanced polyphase voltage under load, as will be hereinafter explained.

My invention will best be understood by reference to the accompanying drawings, in which Figure 1 shows a frame for a single-phase locomotive with its driving motors arranged in accordance with my invention; Fig. 2 shows a diagram of the motor circuits and controlling switches; Fig. 3 shows the starting connections for one of the motors; Fig. 4 shows the running connections of the same; Figs. 5 and 6 are explanatory diagrams showing the method of obtaining balanced polyphase voltages under load; and Figs. 7, 8 and 9 are diagrams of the connections obtained in the three positions of the speed-controlling switch in Fig. 2.

In Fig. 1, A represents the frame of a single-phase locomotive, and B B represent the driving wheels. The driving wheels may be provided with connecting rods $b\ b$, so as to insure the same speed for all the wheels and to distribute the tractive effort equally among the driving wheels at all times. $M^1$, $M^2$ and $M^3$ represent the stators of three polyphase induction motors, which are sleeved on the driving axles, and are provided with ears or lugs engaging the frame of the machine, as shown, to prevent rotation of the stators, but to permit a limited amount of vertical movement. If desired, they may of course be on separate shafts and geared to the axles. The rotor of one of the motors is shown in cross-section at $m^1$. Both stator and rotor may be of any standard induction-motor construction. The rotor $m^1$ is sleeved on the axle and provided with a magnetic clutch $C^1$, by means of which it may be connected to the axle. When the clutch is deënergized the rotor $m^1$ may revolve freely. The motor $M^2$ is provided with a similar clutch $C^2$, while the rotor of the third motor $M^3$ may be fast to the axle.

Referring now to Fig. 2, the stators and rotors of the several motors are indicated by the same reference letters as in Fig. 1, as are also the clutches $C^1$ and $C^2$. D represents the starting and reversing switch, E the speed controlling switch, and F a switch which may be mechanically connected to the switch D, and by means of which balanced polyphase voltages are obtained under load for either direction of rotation. With the switch E in its first position indicated by $1^x$ the primary circuits of motors $M^2$ and $M^3$ are open. The clutches $C^1$ and $C^2$ are also open. The primary winding of the motor $M^1$ is connected through switch E to the starting and reversing switch D. Motor $M^1$ is arranged for a different number of poles from motors $M^2$ and $M^3$. On the drawing, I have indicated that motor $M^1$ is arranged for four poles, and the other two motors for eight poles. Consequently, for the first speed motor $M^1$ is to be operated as a phase-changer, and motors $M^2$ and $M^3$ as driving motors in cascade. For starting in one direction or the other, switch D is moved toward the right or left, and switch F is similarly moved. Assume that switch D is moved toward the left into its first position; a circuit is then closed from the source of current, indicated by the trolley T, to contact $d^1$, to contact $d^2$, where the current divides, part passing through the inductance I, contact $d^5$, contact $d^6$, contact $e^1$, contact $e^7$, to terminal 1 of motor $M^1$, and the other part passing through resistance R, contact $d^3$, contact $d^4$, to terminal 8 of the motor $M^1$. The two terminals 1 and 8 of the motor are thus connected to the source through the phase-splitting device formed by the inductance I and the non-inductive resistance R. The current entering the motor winding at terminal 1, passes out from terminal 3 through contact $f^4$, contact $f^5$, to terminal 4. The phases 1—3 and 8—4 of the motor are consequently joined together at their inner terminals. Terminal 4 is also connected through contact $e^5$, contact $e^4$, contact $f^6$, contact $f^7$, to terminal 5 of the third phase of the motor; the other terminal 7 of this phase being connected to earth. The motor is thus connected in Y with one terminal to earth, and the other two terminals connected to the source through the phase-splitting device. A more or less uniform rotary field is thus produced in the stator winding $M^1$, which causes the rotor $m^1$, which is short-circuited through contacts $e^9$, $e^{10}$, and earth to come up to speed; the clutch circuit $C^1$ being open at contact $e^2$, so that the rotor can start freely. After motor $M^1$ is thus started and is running freely, starting switch D is moved to its second position, in which the trolley is connected directly to motor terminal 1 through contacts $d^1$, $d^6$, $e^1$ and $e^7$, while terminal 8 of the motor is open-circuited. The motor then runs as a single-phase motor, but since it is up to speed, it produces its own rotating field, which induces polyphase voltages at the terminals of the primary winding in the manner well understood in the art. This motor may accordingly be used as a phase-changer to supply polyphase voltages to the other two motors.

The starting and running connections of motor $M^1$ which have been described above are indicated diagrammatically in Figs. 3 and 4 respectively. As indicated by the crossed-dotted lines in Fig. 3, the motor $M^1$ may be started in either direction, according as to which of terminals 1 and 8 is connected to the resistance R, and which to the inductance I. It will be seen by tracing out the circuits in Fig. 2 that the only difference produced by moving switch D toward the right, instead of to the left as above described, is to reverse the relative connections of inductance I and resistance R to the motor terminals 1 and 8. It will be noted in passing that switch F produces no changes in circuit connections in moving from starting to running position.

Before describing the different connections established by switch E for the different speeds, the arrangement for obtaining balanced polyphase voltages under load will be explained.

Referring to Fig. 5, o—x, o—y and o—z represent the induced voltages at no-load in the primary winding of a phase-changer for changing from single to three-phase. The terminals y and z are supposed to be connected to the source. Such a machine, running free as a single-phase motor under no-load, produces a nearly uniform rotary field, so that the length of the line o—x is substantially the same as that of o—y and o—z, the length of which is determined by the impressed voltage. The induced voltages at the terminals x, y and z would consequently be represented by an equilateral triangle,—or in other words, the phase-changer gives a balanced three-phase voltage under no-load. As soon as the phase-changer is loaded, however, the conditions are changed. Assume that the current delivered from terminal x is represented in phase and amount by the line x—w. This current produces a reactive and ohmic drop, the former of which may be represented by the line x—v at right-angles to x—w, while the ohmic drop is represented by the line v—u parallel to the line x—w. The resultant drop is consequently x—u, and the resultant terminal voltage of this phase is consequently represented by o—u. The triangle z y u consequently represents the polyphase voltages supplied by the phase-changer under load, and it will be observed that the voltage o—u is diminished in amount and distorted in phase so that the triangle is no longer equilateral, and the voltages are no longer balanced. This means that the full output is not obtained from the motors supplied by the phase-changer, since the phases are not equally loaded. In order to remedy this defect, I connect the phase-changer as shown diagrammatically in Fig. 6. In this figure one of the phases, the outer terminal $z$ of which is connected to the source, has its inner terminal connected to an intermediate point $t$ on the phase $o$—$y$. For no-load, this connection gives unbalanced voltages represented by the triangle $x\ y\ z$, but this unbalancing at no-load is of no importance. When the phase-changer is loaded with a current delivered from the terminal $x$, represented by the line $x$—$w$, a drop $x$—$u$ is produced in the manner above explained, so that the phases of the induced voltages under load are represented by the triangle $u\ y\ z$. It will be seen that this is substantially an equilateral triangle. That is, by properly selecting the point of connection $t$, approximately balanced voltages under load may be obtained, so that the driving motors supplied from the phase-changer may deliver their full rated output. It will be seen that to obtain the above result the effective turns between the terminals connected to the source are less than between the third terminal and either of the first two, so that the voltage induced between the terminal not connected to the source and the other two terminals is greater on no-load than the voltage of the source. By thus arranging the voltages of no-load the drop under full-load is compensated for. It will further be noted that if a motor is connected as shown in Fig. 6, for one direction of rotation, the relative arrangement of the two phases connected to the source should be reversed for the other direction of rotation. In other words, for the other direction of rotation the phase having its outer terminal connected to $z$ should have its inner terminal connected to $o$, while the phase having its outer terminal connected to $y$ should have its other terminal connected to an intermediate point on the first phase. With these points in mind, the purpose of leads F and the different connections established thereby for the different positions of switch E will be clearly understood.

When switch E is moved to its first running position, which is indicated by $2^\times$, the following connections are established. The connection from trolley T passing through switch D, as above explained, extends to contact $e^1$, which is connected in the position $2^\times$ to terminals 1 and 11 of motors $M^1$ and $M^2$, respectively, through contacts $e^7$ and $e^{14}$. From terminal 1 the current passes out at intermediate terminal 2, through contacts $f^1$, $f^2$, $e^6$, $e^4$, $f^6$ and $f^7$, to terminal 5, and thence through phase 5—7 to earth. Phase 5—7 is thus connected to the intermediate terminal 2 of phase 1—3 in order to obtain balanced polyphase voltages under load, as heretofore explained. Terminal 3 of phase 1—3 is connected through contacts $f^4$ and $f^5$ to terminal 4 of phase 4—8. In motor $M^2$ the current passing in at terminal 11 passes out at terminal 13 through contacts, $f^{11}$ and $f^{12}$, to terminal 14, which is connected through contacts $e^{12}$, $e^{11}$, $f^{13}$ and $f^{14}$, to terminal 15 of the third phase. Motor $M^2$, which is to operate as a driving motor in this position of switch E is thus connected in Y in the usual manner, the intermediate terminals 12 and 16 both being open-circuited. Terminal 18 of motor $M^2$ is connected through contacts $e^{15}$ and $e^8$ to terminal 8 of motor $M^1$, so as to receive the voltage induced at this terminal in motor $M^1$, which is running as a phase-changer, that is, motors $M^1$ and $M^2$ are connected in parallel with one phase connected to the source. Motor $M^2$ is thus supplied with polyphase voltages and its rotor is connected mechanically to the driving wheels, since clutch $C^2$ is energized through contacts $e^3$ and $e^1$. The rotor $m^2$ is connected to the stator $M^3$ through contacts $e^{16}$ and $e^{18}$, and through contacts $e^{17}$ and $e^{19}$, and through earth, so that motors $M^2$ and $M^3$ are connected in cascade. The motors consequently operate at a speed corresponding to sixteen poles. This connection is shown with the switch contacts omitted in Fig. 7. Now, if switch E is moved to its second running position, indicated at $3^\times$, the circuit of clutch $C^2$ is opened so as to permit motor $M^2$ to run free as a phase-changer, and the circuit of clutch $C^1$ is closed so as to connect motor $M^1$ to the driving motor, and at the same time rotor $m^2$ is short-circuited for operation as phase-changer while rotor $m^1$ is connected in cascade with the stator $M^3$, giving a speed corresponding to twelve poles. Furthermore, the stator of motor $M^1$ is now connected in Y in the usual manner for operation as a motor, while the motor $M^2$ is connected in the special manner with terminal 15 connected to intermediate terminal 12, so as to supply balanced polyphase voltages under load as a phase-changer. The above mentioned circuit connections can be readily traced from Fig. 2 after the description that has been given of the circuit connections formed in the first running position of switch E. These connections are shown with the switch contacts omitted in Fig. 8. In the third running position of switch E indicated at $4^\times$ motor $M^1$ is again connected as a phase-changer, while the two eight-pole motors $M^2$ and $M^3$ are connected in parallel as driving motors. This connection will be evident from an inspection of the contact arrangement of Fig. 2 and from Fig. 9, which shows the connections with the switch contacts omitted. Three speeds are thus obtained, corresponding to sixteen, twelve and eight poles respectively; two motors being used in each case as driving motors, and the third as a phase-changer. For operation in the reverse direction, switch E is returned to its off-position indicated at $1^\times$, and switches D and F are moved in the opposite direction from off-position. The motor $M^1$ is consequently started in the opposite direction by the reversal of its connection to the phase-splitting device formed by inductance I and resistance R. At the same time switch F makes the necessary changes in the circuit connections of motors $M^1$ and $M^2$, so that when switch E is again moved to its operative positions the proper connections for phase-changer operation will be secured. That is, with switch F in its other position, displaced toward the right, terminal 5 is no longer connected to terminal 2 when motor $M^1$ acts as a phase-changer, but instead terminal 3 is connected to terminal 6, and terminal 5 instead of terminal 3 is now connected to terminal 4. The same changes are made with respect to motor $M^2$, so that both motors are properly connected for operation both as driving motors and as phase-changers for both directions of rotation.

I do not desire to limit myself to the particular construction and arrangement of parts here shown, but aim in the appended claims to cover all modifications which are within the scope of my invention.

What I claim as new and desire to secure by Letters Patent of the United States, is:

1. In combination with a single-phase source, two polyphase induction motors of different pole-numbers, a load to be driven thereby, means for connecting the primary windings of both motors in parallel, with one phase connected to the source, and means for connecting either motor mechanically to the load.

2. In combination with a single-phase source, two polyphase induction motors of different pole-numbers, a load to be driven, a switch adapted to connect the primary windings of both motors in parallel, with one phase connected to the source, and a magnetic clutch for each motor adapted to connect it mechanically to the load.

3. In combination with a single phase source, two polyphase induction motors of different pole-numbers, a load to be driven, a starting device, means for connecting the primary winding of the motor with the smaller number of poles to the source through said starting device with its rotor running free to start the motor, means for cutting the starting device out of circuit and connecting the primary winding of the second motor in parallel with the first and connecting its rotor mechanically to the load, and means for disconnecting the rotor of the second motor from the load and connecting the rotor of the first motor thereto.

4. In combination with a source of alternating current, two induction motors of different pole-numbers, a third induction motor, and means for connecting the third motor in cascade with either of the other two motors and for connecting the third motor directly to the source.

5. In combination with a source of alternating current, two motors of different pole-numbers, a third motor having the same number of poles as one of the first two motors, and means for connecting the third motor to the source in cascade with either of the other motors and in parallel with the other motor of the same pole-number.

6. In combination with a single-phase source, two polyphase induction motors of different pole-numbers, a load to be driven thereby, means for connecting the primary windings of both motors in parallel, with one phase connected to the source, means for connecting either motor mechanically to the load, a third motor mechanically connected to the load, and means for connecting it in cascade with either of the first two motors.

7. In combination with a single-phase source, two polyphase induction motors of different pole-numbers, a load to be driven thereby, means for connecting the primary windings of both motors in parallel, with one phase connected to the source, means for connecting either motor mechanically to the load, a third motor mechanically connected to the load having the same number of poles as one of the first two motors, and means for electrically connecting it in cascade with either of the first two motors and in parallel with the motor of the same pole-number.

8. In combination with a single-phase supply circuit and a polyphase load circuit, a phase-changer consisting of a polyphase induction motor having its primary connected to both circuits and arranged to deliver under load substantially balanced polyphase voltages to the load circuit.

9. A phase-changer for converting single-phase into polyphase currents consisting of a polyphase induction motor having its primary winding connected and arranged to deliver substantially balanced polyphase voltages under load.

10. A phase-changer for converting single-phase into polyphase currents consisting of a polyphase induction motor having a number of effective turns in the phase of its primary winding connected across the single-phase source smaller than the number of effective turns in another phase.

11. A phase-changer for converting single-phase into polyphase currents consisting of a polyphase induction motor having its primary winding connected and arranged to produce an induced electromotive force in the phase connected to the single-phase source smaller on no-load than the electromotive force induced in another phase.

12. A phase-changer for converting single-phase into three-phase currents consisting of a three-phase induction motor having its primary winding connected in Y but with the inner terminal of one phase connected to an intermediate point on one of the other two phases.

13. A single-phase locomotive comprising two polyphase induction motors of different pole-numbers, means for connecting both motors in parallel with one phase connected to the source of current, and means for connecting either motor mechanically to the driving wheels.

14. An electric locomotive comprising two induction motors of different pole-numbers, a third induction motor having the same number of poles as one of the first two, and means for connecting the third motor in cascade with either of the other two and in parallel with the one having the same pole-numbers.

15. A single-phase locomotive comprising two polyphase induction motors of different pole-numbers, means for connecting both motors in parallel with one phase connected to the source of current, means for connecting either motor mechanically to the driving wheels, a third motor mechanically connected to the driving wheels, and means for connecting it in cascade with either of the other two motors.

16. The method of driving a load at different speeds from a single-phase source by means of polyphase induction motors of different pole-numbers, which consists in connecting the primary windings of the motors in parallel with one phase connected to the source and mechanically connecting the rotors of the motors alternately to the load.

17. The method of driving a load at different speeds from a single-phase source by means of polyphase motors of different pole-numbers, which consists in operating each motor alternately as a phase-changer and as a driving motor for the load.

18. The method of driving a load at different speeds from a single-phase source by means of polyphase induction motors of different pole-numbers, which consists in operating each motor alternately, running free as a phase-changer and with its rotor mechanically connected to the load as a driving motor therefor.

19. The method of obtaining three driving speeds from three induction motors, two of which have different pole-numbers, which consists in connecting the third motor in cascade with either of the other two and directly to the source.

20. The method of obtaining three driving speeds from three induction motors, of which two have different pole-numbers and the third has the same number of poles as one of the first two, which consists in connecting the third rotor in cascade with either of the other two and in parallel with the other motor of the same pole-number.

21. The method of operating a single-phase locomotive equipped with polyphase induction motors of different pole-numbers, which consists in running one motor free as a phase-changer supplying polyphase current to a second motor, and clutching the second motor to the driving wheels, and then running the second motor free as a phase-changer and clutching the first motor to the driving wheels.

22. The method of operating a single-phase locomotive equipped with polyphase induction motors, of which two have different pole-numbers and the third has the same number of poles as one of the first two, which consists in connecting the third motor alternately in cascade with each of the first two motors and in parallel with the one having the same pole-number and using the motor not employed in making each of the three connections as a phase-changer for supplying polyphase currents to the other two motors that are connected in cascade or in parallel.

In witness whereof, I have hereunto set my hand this 7th day of July, 1906.

ERNST F. W. ALEXANDERSON.

Witnesses:
BENJAMIN B. HULL,
HELEN ORFORD.